United States Patent
Hinz et al.

(10) Patent No.: US 8,351,325 B2
(45) Date of Patent: Jan. 8, 2013

(54) METHOD AND SYSTEM FOR LAYER-2 PSEUDO-WIRE RAPID-DEPLOYMENT SERVICE OVER UNKNOWN INTERNET PROTOCOL NETWORKS

(75) Inventors: Michael Hinz, Houston, TX (US); William Hinz, Katy, TX (US); Douglas Stevenson, Rosehearty (GB); Timothy Everitt, Aberdeen (GB)

(73) Assignee: YR20, Houston, TX (US)

( * ) Notice: Subject to any disclaimer, the term of this patent is extended or adjusted under 35 U.S.C. 154(b) by 147 days.

(21) Appl. No.: 12/806,641

(22) Filed: Aug. 18, 2010

(65) Prior Publication Data

US 2012/0044943 A1 Feb. 23, 2012

(51) Int. Cl.
*G01R 31/08* (2006.01)

(52) U.S. Cl. ........ 370/218; 370/254; 370/389; 370/382; 370/401

(58) Field of Classification Search .................. 370/218, 370/221, 230, 235, 254, 389, 392, 395.53, 370/401

See application file for complete search history.

(56) References Cited

U.S. PATENT DOCUMENTS

| | | | |
|---|---|---|---|
| 5,991,798 A | 11/1999 | Ozaki et al. | |
| 6,615,262 B2 | 9/2003 | Schweitzer et al. | |
| 6,957,255 B1 | 10/2005 | Schweitzer et al. | |
| 6,963,912 B1 | 11/2005 | Schweitzer et al. | |
| 7,065,571 B2 | 6/2006 | Schweitzer et al. | |
| 7,467,202 B2 | 12/2008 | Savchuk | |
| 7,474,614 B2 | 1/2009 | Elliot et al. | |
| 7,539,749 B2 | 5/2009 | Schweitzer et al. | |
| 7,558,271 B2 | 7/2009 | Elliot et al. | |
| 7,623,449 B2 | 11/2009 | Shabtay | |
| 7,680,925 B2 | 3/2010 | Sathyanarayana et al. | |
| 2008/0253367 A1 | 10/2008 | Ould-Brahim | |
| 2008/0253381 A1 | 10/2008 | Ward et al. | |
| 2009/0073989 A1 | 3/2009 | Cai et al. | |
| 2009/0219920 A1* | 9/2009 | Brandstatter | 370/352 |
| 2009/0274156 A1* | 11/2009 | Emmendorfer et al. | 370/395.53 |
| 2010/0097943 A1 | 4/2010 | D'Souza et al. | |
| 2010/0254375 A1* | 10/2010 | Feuerhahn et al. | 370/352 |

OTHER PUBLICATIONS

PCT International Search Report for Application No. PCT/US2011/001440, dated Apr. 25, 2012 (17 pages).

* cited by examiner

*Primary Examiner* — Jung Park (74) *Attorney, Agent, or Firm* — The Matthews Firm (57) ABSTRACT

An International Standards Organization ("OSI") Layer-2 ("Ethernet") Pseudo-wire ("OSI Layer-1 type service") appliance, method, system and hub service is disclosed. The method and system facilitate the rapid deployment of Layer-2 Pseudo-wires over unknown and untrusted Internet Protocol ("IP") networks. The method and system facilitate the fluid edge of corporate networks and any situation where the Layer-3 network addresses cannot be changed.

19 Claims, 4 Drawing Sheets

METHOD AND SYSTEM FOR LAYER-2 PSEUDO-WIRE RAPID-DEPLOYMENT SERVICE OVER UNKNOWN INTERNET PROTOCOL NETWORKS

FIELD OF THE INVENTION

The present disclosure relates to a method and system for digital telecommunications. More particularly, the disclosure relates to a method and system for the rapid-deployment and delivery of a Layer-2 Pseudo-wire across a set of unknown Internet Protocol networks and/or Packet Switched Networks including the public Internet.

BACKGROUND OF THE INVENTION

The Open Systems Interconnection model (OSI model) is a product of the Open Systems Interconnection effort at the International Organization for Standardization. It is a way of sub-dividing a communication system into smaller parts called layers. A layer is a collection of conceptually similar functions that provide services to the layer above it and receives services from the layer below it. On each layer an instance provides services to the instances at the layer above and requests service from the layer below.

For example, a layer that provides error-free communications, across a network provides the path needed by applications above it, while it calls the next lower layer to send and receive packets that make up the contents of the path. Conceptually two instances at one layer are connected by a horizontal protocol connection on that layer.

In 1978, work on a layered model of network architecture was started and the International Organization for Standardization (ISO) began to develop its OSI framework architecture. OSI has two major components: an abstract model of networking, called the Basic Reference Model or seven-layer model, and a set of specific protocols. The standard documents that describe the OSI model can be freely downloaded from the ITU-T as the X.200-series of recommendations. A number of the protocol specifications are also available as part of the ITU-T X series. The equivalent ISO and ISO/IEC standards for the OSI model are available from ISO, but only some of them at no charge.

The concept of a 7-layer model was provided by the work of Charles Bachman, then of Honeywell. Various aspects of OSI design evolved from experiences with the ARPANET, the fledgling Internet, NPLNET, EIN, CYCLADES network and the work in IFIP WG6.1. The new design was documented in ISO 7498 and its various addenda. In this model, a networking system is divided into layers. Within each layer, one or more entities implement its functionality. Each entity interacts directly only with the layer immediately beneath it, and provides facilities for use by the layer above it.

Protocols enable an entity in one host to interact with a corresponding entity at the same layer in another host. Service definitions abstractly describe the functionality provided to an (N)-layer by an (N−1) layer, where N is one of the seven layers of protocols operating in the local host.

The OSI layers are the Physical Layer (Layer-1), the Data Link Layer (Layer-2), the Network Layer (Layer-3), the Transport Layer (Layer-4), the Session Layer (Layer-5), the Presentation Layer (Layer-6) and the Application Layer (Layer-7).

The Physical Layer or Layer-1 defines the electrical and physical specifications for devices. In particular, it defines the relationship between a device and a physical medium. This includes the layout of pins, voltages, cable specifications, hubs, repeaters, network adapters, host bus adapters, (HBAs used in storage area networks) and more. The Physical Layer can be contrasted with the functions of the Data Link Layer. The Physical Layer is concerned primarily with the interaction of a single device with a medium, whereas the Data Link Layer is concerned more with the interactions of multiple devices (i.e., at least two) with a shared medium. Standards such as RS-232 do use physical wires to control access to the medium.

The major functions and services performed by the Physical Layer, Layer-1, are: (1) establishment and termination of a connection to a communications medium; (2) participation in the process whereby the communication resources are effectively shared among multiple users. For example, contention resolution and flow control; and (3) modulation, or conversion between the representation of digital data in user equipment and the corresponding signals transmitted over a communications channel. These are signals operating over the physical cabling (such as copper and optical fiber) or over a radio link.

The Data Link Layer is Layer-2 of the seven-layer OSI model of computer networking. It corresponds to, or is part of the link layer of the TCP/IP reference model. The Data Link Layer is the protocol layer, which transfers data between adjacent network nodes in a wide area network or between nodes on the same local area network segment. The Data Link Layer provides the functional and procedural means to transfer data between network entities and might provide the means to detect and possibly correct errors that may occur in the Physical Layer. Examples of data link protocols are Ethernet for local area networks (multi-node), the Point-to-Point Protocol (PPP), HDLC and ADCCP for point-to-point (dual-node) connections.

The Data Link Layer, Layer-2, is concerned with local delivery of frames between devices on the same LAN. Data Link frames, as these protocol data units are called, do not cross the boundaries of a local network. Inter-network routing and global addressing are higher layer functions, allowing Data Link or Level-2 protocols to focus on local delivery, addressing, and media arbitration. In this way, the Data Link layer is analogous to a neighborhood traffic cop; it endeavors to arbitrate between parties contending for access to a medium. When devices attempt to use a medium simultaneously, frame collisions occur. Data Link protocols specify how devices detect and recover from such collisions. Further, Data Link protocols may provide mechanisms to reduce or prevent collisions.

A frame is the unit of transmission in a link layer protocol, and consists of a link-layer header followed by a packet. A data packet on the wire or frame consists of just a long string of binary 0s and 1s. A frame review on the actual physical wire would show Preamble and Start Frame Delimiter, in addition to the other data. These are required by all physical hardware. If a receiver is connected to the system in the middle of a frame transmission, it ignores the data until it detects a new frame synchronization sequence. However, Preamble and Start Frame Delimiters are not displayed by packet sniffing software because these bits are stripped away at OSI Layer-1 by the Ethernet adapter before being passed on to the OSI Layer-2 which is where packet sniffers collect their data from. There are OSI Physical Layer sniffers, which can capture and display the Preamble and Start Frame but they are expensive and mainly used to detect physical related problems. Examples of frames are Ethernet frames (maximum 1500 byte plus overhead), PPP frames and V.42 modem frames.

Delivery of frames by Layer-2 devices is affected through the use of unambiguous hardware addresses. A frame's header contains source and destination addresses that indicate which device originated the frame and which device is expected to receive and process it. In contrast to the hierarchical and routable addresses of the network layer (Layer-3), Layer-2 addresses are flat, meaning that no part of the address can be used to identify the logical or physical group to which the address belongs. This can be an important feature. The data link thus provides data transfer across the physical link. That transfer can be reliable or unreliable. Many data link protocols do not have acknowledgments of successful frame reception and acceptance, and some data link protocols might not even have any form of checksum to check for transmission errors. In those cases, higher-level protocols must provide flow control, error checking, and acknowledgments and retransmission.

In IEEE 802 local area networks, the services and protocols specified map to the lower two layers (Data Link and Physical) of the seven-layer OSI networking reference model. The IEEE 802 standards are restricted to networks carrying variable-size packets. In fact, IEEE 802 splits the OSI Data Link Layer-2 into two sub-layers named or described in more detail as the Media Access Control (MAC) and Logical Link Control (LLC) sublayers. This means that the IEEE 802.2 LLC protocol can be used with all of the IEEE 802 MAC layers, such as Ethernet, token ring, IEEE 802.11, etc., as well as with some non-802 MAC layers such as FDDI. Other Data Link Layer-2 protocols, such as HDLC, are specified to include both sublayers, although some other protocols, such as Cisco HDLC, use HDLC's low-level framing as a MAC layer in combination with a different LLC layer. In the ITU-T G.hn standard, which provides a way to create a high-speed (up to 1 Gigabit/s) Local area network using existing home wiring (power lines, phone lines and coaxial cables), the Data Link Layer is divided into three sub-layers (Application Protocol Convergence, APC; Logical Link Control, LLC; and Medium Access Control, MAC).

Within the semantics of the OSI network architecture, the Data Link Layer, Layer-2, protocols respond to service requests from the Network Layer, Layer-3, and they perform their function by issuing service requests to the Physical Layer, Layer 1.

The Network Layer, Layer-3, provides the functional and procedural means of transferring variable length data sequences from a source to a destination via one or more networks, while maintaining the quality of service requested by the Transport Layer. The Network Layer performs network routing functions, and might also perform fragmentation and reassembly, and report delivery errors. Routers operate at this layer—sending data throughout the extended network and making the Internet possible. This is a logical addressing scheme—values are chosen by the network engineer. The addressing scheme is hierarchical.

The Transport Layer, Layer-4, provides transparent transfer of data between end users, providing reliable data transfer services to the upper layers. The Transport Layer controls the reliability of a given link through flow control, segmentation/desegmentation, and error control. Some protocols are state and connection oriented. This means that the Transport Layer can keep track of the segments and retransmit those that fail. Although not developed under the OSI Reference Model and not strictly conforming to the OSI definition of the Transport Layer, typical examples of Layer 4 are the Transmission Control Protocol (TCP) and User datagram Protocol (UDP).

The Session Layer, Layer-5, controls the dialogues or connections between computers. It establishes, manages and terminates the connections between the local and remote application. It provides for full-duplex, half-duplex or simplex operation, and establishes check-pointing, adjournment, termination, and restart procedures. The OSI model made this layer responsible for graceful close of sessions, which is a property of the Transmission Control Protocol, and also for session check-pointing and recovery, which is not usually used in the Internet Protocol Suite. The Session Layer is commonly implemented explicitly in application environments that use remote procedure calls.

The Presentation Layer, Layer-6, establishes a context between Application Layer entities, in which the higher-layer entities can use different syntax and semantics, as long as the presentation service understands both and the mapping between them. The presentation service data units are then encapsulated into Session Protocol data units, and moved down the stack. This layer provides independence from differences in data representation (e.g., encryption) by translating from application to network format, and vice versa. The Presentation Layer, Layer-6, works to transform data into the form that the Application Layer can accept. Layer-6 formats and encrypts data to be sent across a network, providing freedom from compatibility problems. It is sometimes called the Syntax Layer.

The Application Layer, Layer-7, provides network process to application functions.

Ethernet, which is standardized by IEEE 802.3, was developed in 1980 and is a family of frame-based computer networking technologies for local area networks (LANs). The name came from the physical concept of the ether. It defines a number of wiring and signaling standards for the Physical Layer, Layer-1, OSI networking model, as well as a common addressing format and Media Access Control at the Data Link Layer.

Ethernet has become and continues to be the dominant Layer-2 digital communications technology. Internet Protocol (IP), which is standardized by the Internet Engineering Task Force ("IETF"), was developed in 1981 and has become the dominant Layer-3 digital communications technology.

The combination of the twisted-pair versions of ethernet for connecting end systems to the network, along with the fiber optic versions for site backbones, is the most widespread-wired LAN technology. It has been used from around 1980 to the present, largely replacing competing LAN standards such as token ring, FDDI and ARCNET.

Pseudo-wire is a collection of technologies, which create a Layer-2 connection across an underlying Layer-3 communications service. Pseudo-wire is the common term for any technology that provides an OSI Layer-1 (physical layer, i.e., "wire") service over a Packet Switched Network (PSN). A Packet Switched Network is any combination of one or more Intranets and the Internet. The direct peer-to-peer Pseudo-wire services are limited because they require special firewall configurations to permit them to work in most public Internet networks.

A PSN-Tunnel is a software tunnel that carries a service such as a Pseudo-wire across a Packet Switched Network, PSN or any combination of one or more Intranets and the Internet.

In recent years, the telecommunications companies also known as "Telcos" or "Telcoms" have provided much of the Internet services. Particularly, Telco voice and data services have progressively consolidated to focus on providing Layer-3 IP based services. However, many Telcos are now offering a variety of Layer-2 Carrier Ethernet services; such as by way of example, Point-to-Point "LAN Extension" Services, Metro Ethernet Multi-Point-to-Multi-Point Services and even Global Ethernet Services.

Increasingly, many customers prefer to procure communications services as Layer-2 rather than as Layer-3 in order to achieve technical simplicity and greater security. When a Telco provides a Layer-3 service to a customer then the Telco and the customer have to fully co-operate on Layer-3 matters such as, for example without limitation, Layer-3 addressing plans (e.g., W addresses), Layer-3 routing protocols (e.g., OSPF and BGP), etc. This is cumbersome for both the Telco and the customer and if a customer uses many Telcos such Layer-3 co-operation can become onerous and unworkable.

When a Telco provides a Layer-2 service to a customer, then the Telco and the customer have requirements to co-operate albeit less than when providing a Layer-3 service, thus it is easier for both customer and Telco. Nonetheless, the adjacent layers are in communication one with the other, and such communication must be coordinated. Still further, when a Telco provides a Layer-3 service to a customer, then the Telco has access to the customer's Layer-3 network, which is a potential security risk. When a Telco provides a Layer-2 service to a customer, then the Telco has no access to the customer's Layer-3 network, thus it is easier for both customer and Telco.

The current Telco Layer-2 services are limited in two primary ways. First, the Telco Layer-2 services can only be provisioned across the Telco's core network and other networks with Telco-Telco Network-Network Interconnect (NNI) agreements. Second, the Telco usually takes 30-90 days to implement and integrate such additional Layer-2 services into existing Telco core network and other networks with Telco interconnect agreements. These arrangements make it difficult to provide services to sites that are not served by the Telco's own or interconnected infrastructure and make it difficult to provide services rapidly.

Another important issue with Telco Layer-3 network offerings is mismatched features and requirements between or among networks. For example, one carrier may support five different classes of service while another may support only three. Unless the carriers have the same number of classes of service, each with identical parameters, it is extremely difficult to translate services between carriers at the NNI in a way that meets the end customer's desired level of service from the carrier or carriers.

Other problems include mismatched inter-carrier logical and physical interfaces, transport methods, packet encapsulation, and the like. Unless both carriers agree on the physical media and the have such physical media available, then such inter-carrier logical and physical interfaces are incompatible.

These are only a few of the many and sundry problems that are associated with providing Telco services, generally, and Telco Layer-2 services, specifically. These are problems that have been present since the inception of providing Telco services. There has existed, and continues to exist, a huge need to provide such Telco services.

Further, the many and sundry problems exist in an industry with stellar, first-rate technical capabilities and personnel. Unfortunately, neither the stellar, first-rate technology nor the stellar, first-rate personnel have been able to solve the many problems associated with providing such services. To the contrary, as the demand for additional Telco services has risen, the problems associated with providing the services has exceed the demand. These problems are particularly acute at the fluid edge of the network, often referred to as "the last mile." The edge of the network is contrasted with a core network, which refers to the high capacity communication facilities that connect primary nodes, rather than edge devices that provide entry points into service provider networks and/or the core network. Time is always of the essence with respect to conditions and locations at the edge of the network. There exists no likelihood of success with respect to solving the type of persistent problems herein discussed, and to achieve success over such problems is unexpected.

It is desirable to overcome the limitations of the current Telco Layer-2 and Layer-3 services and the limitations of Internet/firewall deployment.

It is, therefore, a feature of the present disclosure to provide a method and system for a Layer-2 Pseudo-wire rapid-deployment service over unknown Internet protocol networks.

Another feature of the present disclosure is to provide a method and system for the interconnection of disparate networks in a rapid and time efficient manner where the disparate networks are not served by a common Telco or are at locations that are not presently well served by the Telco. See, for example, FIG. 1 with respect to the "connection" between CE-A (102) and CE-B (202).

Yet another feature of the present disclosure is to provide a method and system that addresses the problem of rapid connectivity of an existing network to a new location or locations not presently served by a customer's incumbent Telco via a physical connection. See, for example, FIGS. 1 and 2 reference CE-A (102) and CE-B (202).

Yet still another feature of the present disclosure is to provide a method and system that offers almost instant Layer-2 connectivity over any available physical media (general Internet service via DSL, Satellite, Wireless and the like) between the locations (for example, CE-A and CE-B) in the interim period prior to the incumbent Telco's permanent connectivity solution whereby such deployments, even in major metropolitan locations, can take several months.

The above features of the present disclosure are of high value to industry and the problems are not well addressed, if at all, by existing solutions and methods.

Additional features and advantages of the disclosure will be set forth in part in the description which follows, and in part will become apparent from the description, or may be learned by practice of the method or system. The features and advantages of this disclosure may be realized by means of the combinations and steps particularly pointed out in the appended claims.

SUMMARY OF THE INVENTION

To achieve the foregoing objects, features, and advantages and in accordance with the purpose of this disclosure as embodied and broadly described herein, a method and system for layer-2 Pseudo-wire rapid-deployment service over unknown internet protocol networks is provided.

A Provider-Edge (PE) appliance is installed at a first (A) Customer Site. It presents 2 Ethernet ports; an Access-Circuit (AC) service port used to connect a Customer-Edge (CE) appliance, and a trunk Packet-Switched-Network (PSN) port. A Provider-Edge (PE) appliance is installed at a second (B) Customer Site. It presents 2 Ethernet ports; an Access-Circuit (AC) service port used to connect a Customer-Edge (CE) appliance, and a trunk Packet-Switched-Network (PSN) port. Two Provider-Core (PC) appliances are installed at a Provider Site. They each present 2 Ethernet ports; a trunk Packet-Switched-Network (PSN) port and a X-Connect (XC) port (X-Connect or XC is a synonym for Cross-Connect).

The Provider-Edge PE-A appliance at customer site A is configured to use the PSN-A connection to the trunk network and establish a PSN-Tunnel connection to the Provider-Core PC-A hub/service site appliance for customer site A which has been pre-configured to accept an incoming connection request from Provider-Edge PE-A. Once the PSN-Tunnel connection is established a Pseudo-wire connection exists between the Access-Circuit AC-A on Provider-Edge PE-A and the X-Connect XC-A on Provider-Core PC-A.

The Provider-Edge PE-B appliance at customer site B is configured to use the PSN-B connection to the trunk network and establish a PSN-Tunnel connection to the Provider-Core PC-B hub/service site appliance for customer site B which has been pre-configured to accept an incoming connection request from Provider-Edge PE-B. Once the PSN-Tunnel connection is established a Pseudo-wire connection exists between the Access-Circuit AC on Provider-Edge PE-B and the X-Connect XC on the Provider-Core PC-B.

When the X-Connect XC-A port on Provider-Core PC-A is cabled to the X-Connect XC-B port on Provider-Core PC-B then an end-to-end Pseudo-wire connection exists between the Access-Circuit AC-A port on Provider-Edge PE-A and the Access-Circuit AC-B port on Provider-Edge PE-B.

BRIEF DESCRIPTION OF THE DRAWINGS

The accompanying drawings, which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

The method and system for the rapid-deployment and delivery of a Layer-2 Pseudo-wire across a set of unknown Internet Protocol networks and/or Packet Switched Networks including the public Internet is termed as FastL2 technology.

In order to understand the various aspect of the FastL2 technology, an understanding of the technology directly related to the present disclosure is provided. Generally, the FastL2 technology uses the fundamental technology building blocks that are available through IEEE standards (Ethernet, Posix, etc.), IETF standards (TCP/IP, VPNs, etc.), ISO standards (OSI, etc.), and FSF GPL licensed software (Linux Kernel, OpenVPN, Compression, Encryption, etc.).

Ethernet was initially developed by Xerox (Ethernet I) as disclosed in U.S. Pat. No. 4,063,220. Dec, Intel and Xerox collaborated on Ethernet II (aka DIX Ethernet), in about 1980, which resulted as an IEEE draft standard. IEEE formed Project 802, which is still running and generates all the IEEE 802.xxx standards, which completely dominate LANs today and are cross standardized by ISO, IEC, etc. Ethernet Bridging via Spanning-Tree was developed by Radia Perlman at DEC, and then standardized as IEEE802.1D.

The FastL2 technology is used to connect Ethernet LANs together via MEE802.1D bridging, which technology is incorporated herein for all purposes.

ISO, now ISO & ITU Open Systems Interconnect (OSI) created the 7-layer network model including Layer-2, the Data-Link layer (e.g. Ethernet), and Layer-3, the Network Layer (e.g. the Internet Protocol (IP)). The 7-layer model is described in the ITU X.200 series of standards.

The FastL2 technology provides a Layer-2 service (Ethernet-Ethernet) across a Layer-3 carrier/trunk service (Internet Protocol), which technology is incorporated herein for all purposes.

The Internet TCP/IP was developed by the U.S. Defense Advanced Research Project Administration (DARPA). The Internet TCP/IP standards are published by the Internet Engineering Task Force (IETF) as RFCxxxx. As of this writing, there are 7,000+RFCs. The Internet Protocol (IP) (versions 4 & 6) has now become the de-facto common-carrier system for all communications including "the Internet."

The FastL2 technology uses a Layer-3 Internet Protocol (EP) service such as the public Internet or a private Intranet as the carrier/trunk service, which technology is incorporated herein for all purposes.

The Unix/Linux (aka *nix) Computer Operating Systems was originally ad-hoc developed within Bell Labs. The *nix Computer Operating Systems have now been standardized in a variety of ways, for example, IEEE POSIX operating system standards, Open Group Single Unix Specification (aka Spec 1170), and Linux implementation released under Free Software Foundation (FSF) General Public License (GPL).

The FastL2 hubs and appliances use the Fedora [Mike Hinz1] software (currently version 12) for distribution of the Linux operating system. The Fedora software includes a wide range of systems and libraries used by the FastL2 technology, such as compression, encryption, etc. The Linux and Fedora software are released under the FSF General Public License, which technology is incorporated herein for all purposes.

Virtual Machine (VM) Systems were originally developed within IBM for Mainframes (VM/CMS) in the 1970s. The Virtual Machine (VM) Systems were added to the Linux OS kernel starting in 2009 together with the necessary Ethernet Layer-2 bridging (see above) capabilities.

The FastL2 technology uses the Ethernet Layer-2 bridging capabilities added to the Linux Kernel for support of Virtual Machines, which technology is incorporated herein for all purposes.

Virtual Private Network (VPN) Systems were originally developed by a variety of organizations in the 1990s. Now, Virtual Private Network (VPN) Systems are standardized in a variety of IETF RFC standards. Microsoft and Cisco technology has been standardized as IETF Layer-2 Trunk Protocol (L2TP) and the IETF's own working party technology has been standardized as Private Wire Edge-to-Edge Emulation (PWE3). L2TP is often used for single-PC VPNs and PWE3 is used for Carrier Ethernet networks.

The FastL2 technology uses Pseudo-wire (PW) VPN trunks using [Mike Hinz2] tunneling software such as SSH, Vtun, OpenVPN, or Tinc. [Mike Hinz3]

Illustrative embodiments of the present disclosure are provided herein. Several applicable embodiments can be generally defined as:

(1) Two Pseudo-wire legs which are cross-connected at a Provider-Core (PC) hub/service site on the Internet.
(2) One Pseudo-wire leg between Provider-Edge (PE) appliances on a single autonomous Intranet.
(3) One Pseudo-wire leg connected to the Internet.
(4) One Pseudo-wire leg connected to a private Intranet.
(5) One Pseudo-wire leg acting as a "last-mile" backhaul for another Telco Layer-2 service.

Figure 1:
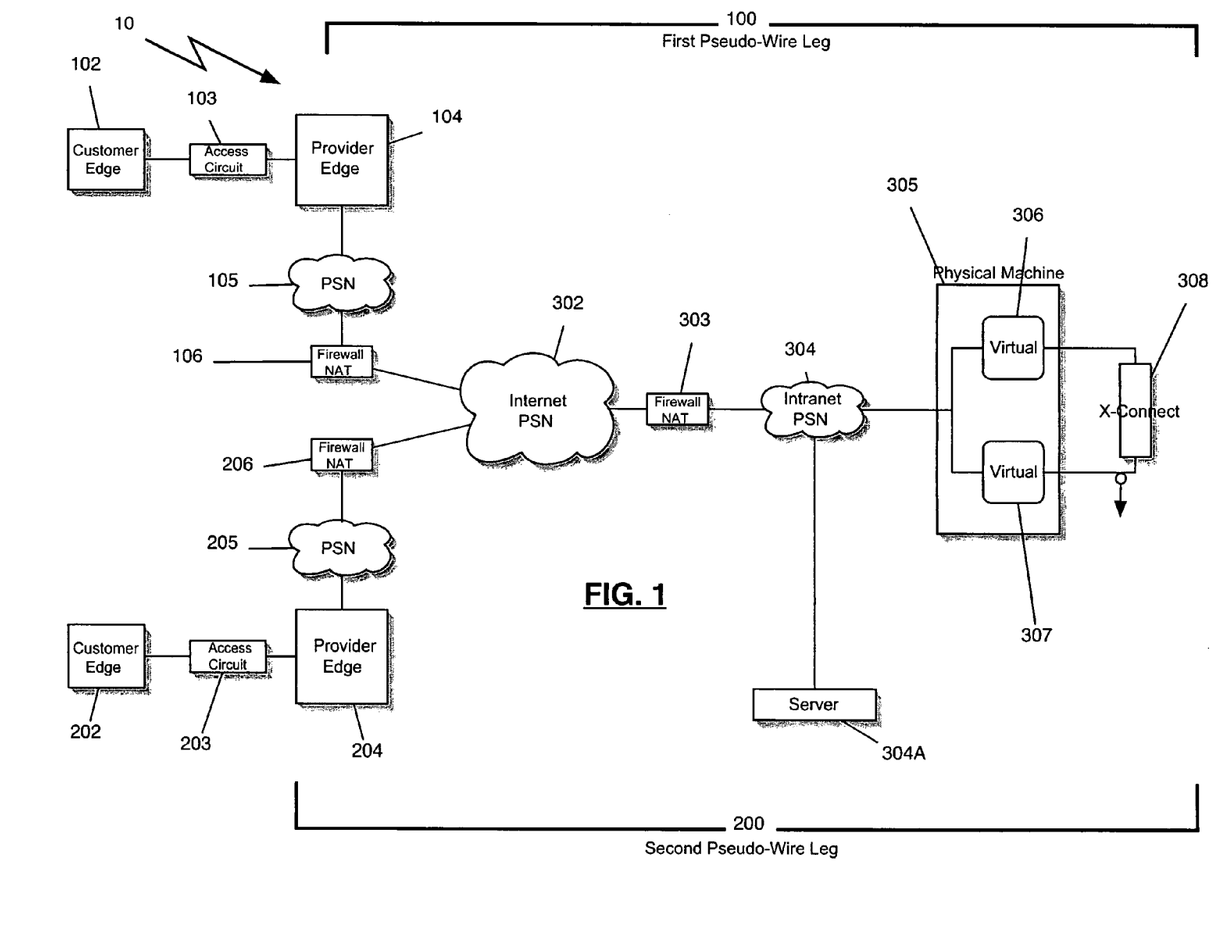
FIG. 1 is a block diagram of a preferred embodiment of a method/system for the rapid-deployment and delivery of a Layer-2 Pseudo-wire across a set of unknown Internet Protocol networks and/or Packet Switched Networks including the public Internet encompassed by the present disclosure.

FIG. 1 is a block diagram of a preferred embodiment of a method/system for the rapid-deployment and delivery of a Layer-2 Pseudo-wire across a set of unknown Internet Protocol networks and/or Packet Switched Networks including the public Internet encompassed by the present disclosure.

The system 10 comprises a customer edge device 102 and an access circuit 103 in association with a first leg 100; a customer edge device 202 and an access circuit 203 in association with a second leg 200; and an X-connect or cross-connect 308. The customer edge device 102, 202 can be a computer, a hub, a switch, a router, or any similar or like device, as well as a collection of such devices or any combinations thereof.

The first leg 100 includes a FastL2 Provider Edge device 104, an Intranet Packet Switched Network 105, a firewall/NAT 106, an Internet Packet Switched Network 302, a firewall/NAT 303, an Intranet Packet Switched Network 304 (including optionally a Syslog Server 304A), a Physical Machine 305, and a virtual machine 306.

The second leg 200 includes a FastL2 Provider Edge device 204, an Intranet Packet Switched Network 205, a firewall/NAT 206, the Internet Packet Switched Network 302, the firewall/NAT 303, the Intranet Packet Switched Network 304 (including optionally the Syslog Server 304A), the Physical Machine 305, and a virtual machine 307. The X-Connect 308 interconnects the first leg 100 and the second leg 200 and thus provides rapid-deployment and delivery of service between the first customer edge device 102 and the second customer edge device 202.

The system 10 provides the rapid-deployment and delivery of a Layer-2 Pseudo-wire across a set of unknown Internet Protocol networks and/or Packet Switched Networks including the public Internet.

Figure 2:
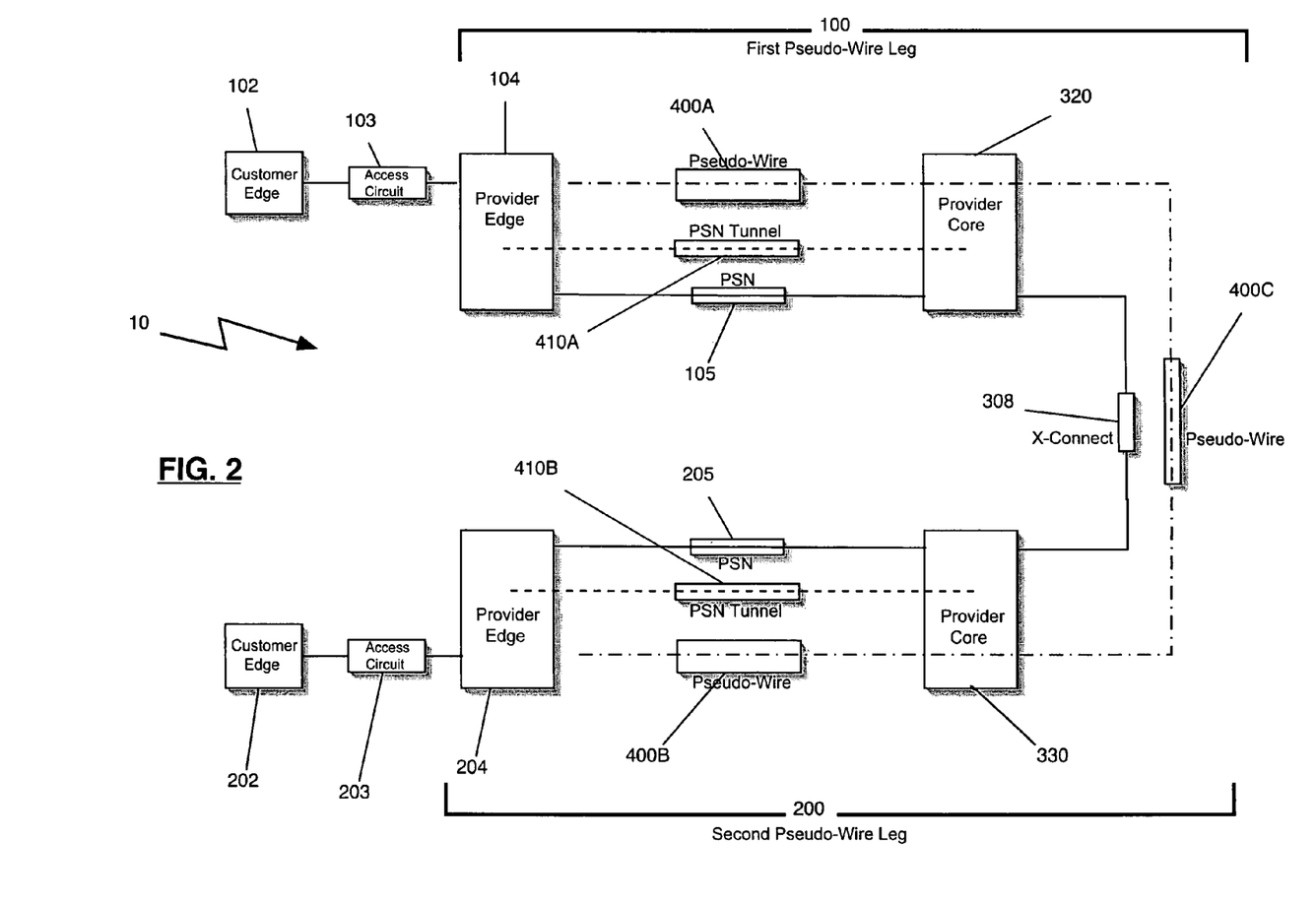
FIG. 2 is a block diagram of another view of the preferred embodiment of a method/system for the rapid-deployment and delivery of a Layer-2 Pseudo-wire across a set of unknown Internet Protocol networks and/or Packet Switched Networks including the public Internet encompassed by the present disclosure as illustrated in FIG. 1.

FIG. 2 is a block diagram of another view of the preferred embodiment of a method/system for the rapid-deployment and delivery of a Layer-2 Pseudo-wire across a set of unknown Internet Protocol networks and/or Packet Switched Networks including the public Internet encompassed by the present disclosure as illustrated in FIG. 1. The system 10 comprises a customer edge device 102 and an access circuit 103 in association with a first leg 100; a customer edge device 202 and an access circuit 203 in association with a second leg 200; and an X-connect or cross-connect 308. The customer edge device 102, 202 can be a computer, a hub, a switch, a router, or any similar or like device, as well as a collection of such devices or any combinations thereof.

The first leg 100 includes a FastL2 Provider Edge device 104, an Intranet Packet Switched Network 105 and a Provider Core Equipment 320. The second leg 200 includes a FastL2 Provider Edge device 204, an Intranet Packet Switched Network 205 and a Provider Core Equipment 330.

Further, FIG. 2 illustrates PSN-Tunnels 410A, 410B between the FastL2 Provider Edge 104, 204 and the Provider Core Equipment 320, 330, respectively. Still further, FIG. 2 illustrates a Pseudo-wire 400A, 400B, 400C in association with the FastL2 Provider Edge for customer A 104, the Provider Core Equipment for customer A 320, the FastL2 Provider Edge for customer B 204, and the Provider Core Equipment for customer B 330. The Pseudo-wire 400A, 400B, 400C provides a heretofore unavailable direct connection between the customer edge device 102 and the customer edge device 202, i.e., the rapid-deployment and delivery of a Layer-2 Pseudo-wire 400A, 400B, 400C across a set of unknown Internet Protocol networks and/or Packet Switched Networks including the public Internet.

Figure 3:
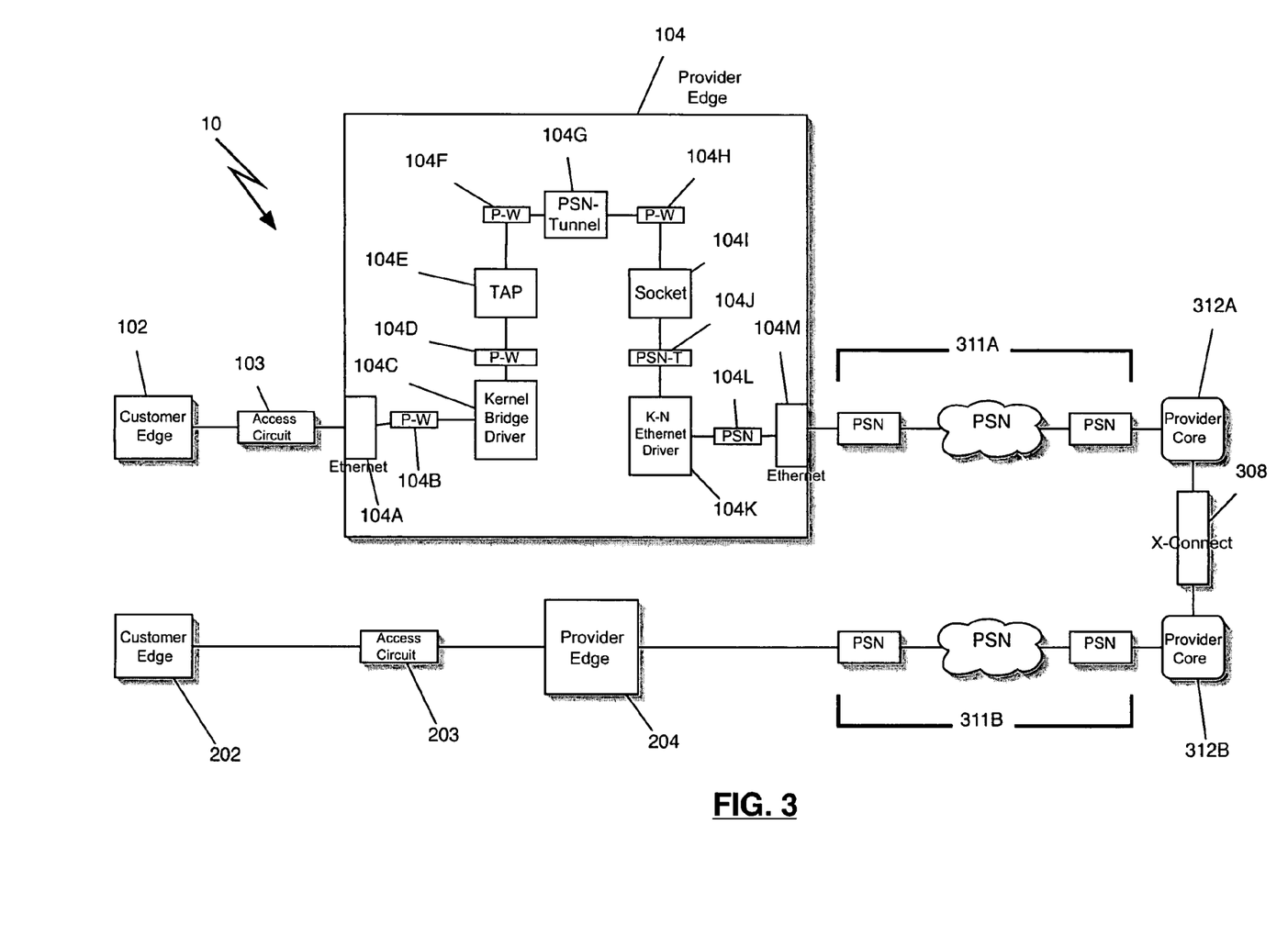
FIG. 3 is a block diagram of a preferred embodiment of Provider Edge system as a physical machine or a virtual machine as practiced with the method/system for the rapid-deployment and delivery of a Layer-2 Pseudo-wire across a set of unknown Internet Protocol networks and/or Packet Switched Networks including the public Internet encompassed by the present disclosure.

FIG. 3 is a block diagram of a preferred embodiment of Provider Edge system as a physical machine or a virtual machine as practiced with the method/system for the rapid-deployment and delivery of a Layer-2 Pseudo-wire across a set of unknown Internet Protocol networks and/or Packet Switched Networks including the public Internet encompassed by the present disclosure.

FIG. 3 illustrates the Customer Edge devices 102, 202 in association with the respective access circuits 103, 203. Operatively engaged thereto are the Provider Edge systems 104, 204. The Provider Edge Systems 104, 204 are in communication with the Packet Switched Networks 311, the PC Systems 312A and 312B on the provider site and the X-connect or cross-connect 308.

The Provider Edge systems 104 comprises an Ethernet device 104A, a Pseudo-wire 104B, a Kernel bridge driver(s) 104C, a Pseudo-wire 104D, a tap device 104E, a Pseudo-wire 104F, a PSN-Tunnel Daemon 104G, a Pseudo-wire 104H, a socket(s) API 104I, a PSN-Tunnel 104J, at least one or a combination of a Kernel network and Ethernet driver(s) 104K, a PSN 104L and an Ethernet device 104M.

A FastL2 PE appliance can be built as provided herein. It is appreciated by those skilled in the art that many and varied ways of applying, implementing and making an system or method pursuant to the present disclosure is possible. The computer hardware is a computer system capable of running Linux. The computer system has two Ethernet interfaces, presumed to be eth0 and eth1. A complete installation of the Fedora Linux distribution, version 12 or greater is installed on the computer hardware.

Then, perform the following steps:

| Step | Instruction |
|------|-------------|
| 1. | Reduce the running Linux system to the required minimum:<br>Edit /etc/inittab and change the runlevel to 3<br>Use a utility such as "ntsysv" to reduce the runtime services to run only the "network" service. |
| 2. | Decide on the physical interfaces and their functions. For example:<br>Physical interface eth0 will be the interface to the PSN.<br>Physical interface eth1 will be the AC interface to the CE.<br>Use a utility such as "ip" to identify the Ethernet Medium Access Control (MAC) address of each interface. |
| 3. | Configure the physical interfaces:<br>Create a file, /etc/sysconfig/network-scripts/ifcfg-eth0 for the PSN interface:<br>Configure the IP address to be DHCP or static per build-engineer preferences.<br>Configure the MAC address to ensure that the network system uses the correct interface.<br>Create a file, /etc/sysconfig/network-scripts/ifcfg-eth1 for the AC interface:<br>Configure the MAC address to ensure that the network system uses the correct interface.<br>Do not configure any IP addressing, as this interface will be used for layer-2 bridging and not layer-3 IP. |
| 4. | Install the kernel module for tunnelling:<br>Use a utility such as "insmod" to install the "tun" kernel module. |
| 5. | Create the user-space tap device to permit tunnelling by a user-space program.<br>Use a utility such as "mknod" to create a tap1 pseudo-interface. |

| Step | Instruction |
|---|---|
| 6. | Create a kernel layer-2 bridge group that includes the eth1 (AC) and tap1 interfaces as follows:<br>Use the "brctl" utility to create a bridge-group br1.<br>Use the "brctl" utility to add the eth1 and tap1 interfaces to bridge-group br1. |
| 7. | Configure the interfaces in bridge-group br1 to be operational as follows:<br>Use a utility such as "ip" to configure the br1, eth1 and tap1 interfaces to have an IP address of 0.0.0.0, to be promiscuous and to have a runstate of "up". |
| 8. | Decide on the utility software to use to create the PSN-TUNNEL over the PSN between the tap1 device on the PE and the peer tap-device on the PC. The most commonly used candidate systems are; Secure-Shell (ssh), Vtun, OpenVPN and Tinc. |
| 9. | Identify the PSN IP address, user credentials, and optionally the TCP/UDP port details for the peer tap-device on the PC. |
| 10. | Create the PSN-TUNNEL over the PSN between the tap1 device on the PE and the peer tap-device on the PC. Ssh basic example is:<br>   ssh -o Tunnel=Ethernet -w 1:1 <user>@<PC-IP-address><br>Configurations are different for the other utilities but are fully documented in publicly available documentation. |
| 11. | Once operational, steps 3 through 10 can be automated in scripts per the build-engineer's preferred arrangement such as Upstart or via /etc/rc.d/rc.local. |

Figure 4:
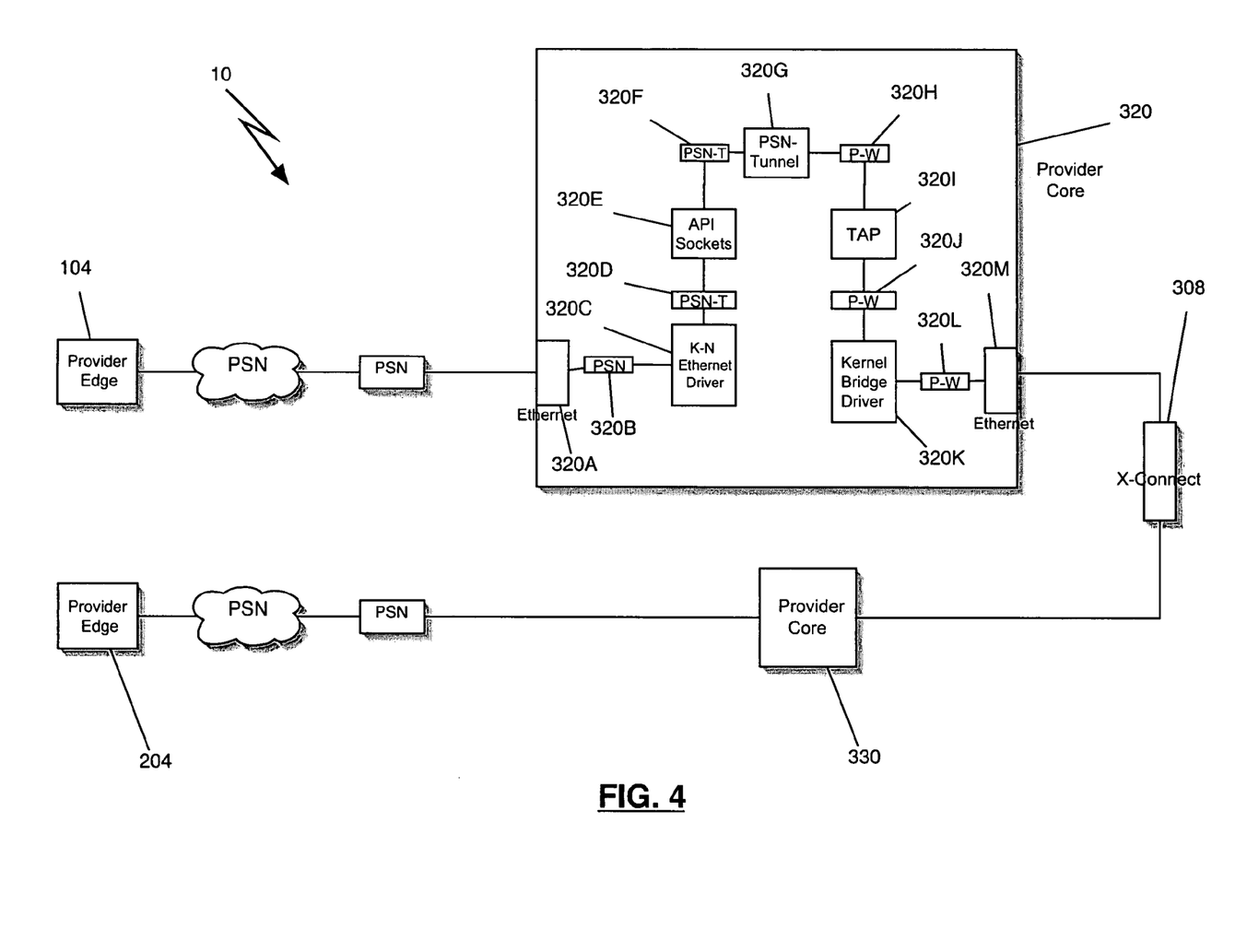
FIG. 4 is a block diagram of a preferred embodiment of Provider Core system as a physical machine or a virtual machine as practiced with the method/system for the rapid-deployment and delivery of a Layer-2 Pseudo-wire across a set of unknown Internet Protocol networks and/or Packet Switched Networks including the public Internet encompassed by the present disclosure.

FIG. 4 is a block diagram of a preferred embodiment of Provider Core system as a physical machine or a virtual machine as practiced with the method/system for the rapid-deployment and delivery of a Layer-2 Pseudo-wire across a set of unknown Internet Protocol networks and/or Packet Switched Networks including the public Internet encompassed by the present disclosure. FIG. 4 illustrates the Provider Core System 320 in association with the respective Provider Edge Systems 104, 204. The Provider Core System 320 comprises an Ethernet device 320A, a Packet Switched Network 320B, at least one or a combination of a Kernel Network and Ethernet drivers 320C, a PSN-Tunnel 320D, API sockets 320F, a PSN-Tunnel 320F, a PSN-Tunnel Daemon 320G, a Pseudo-wire 320H, a tap device 320I, a Pseudo-wire 320J, a Kernel bridge driver 320K, a Pseudo-wire 320L and an Ethernet device 320M.

A FastL2 PC appliance can be built as provided herein. It is appreciated by those skilled in the art that many and varied ways of applying, implementing and making an system or method pursuant to the present disclosure is possible. The computer hardware is a computer system capable of running Linux. The computer system has two Ethernet interfaces, presumed to be eth0 and eth1. A complete installation of the Fedora Linux distribution, version 12 or greater is installed on the computer hardware.

Then, perform the following steps:

| Step | Instruction |
|---|---|
| 1. | Reduce the running Linux system to the required minimum:<br>Edit /etc/inittab and change the runlevel to 3<br>Use a utility such as "ntsysv" to reduce the runtime services to run only the "network" service. |
| 2. | Decide on the physical interfaces and their functions. For example:<br>Physical interface eth0 will be the interface to the PSN.<br>Physical interface eth1 will be the XC interface to the peer PC.<br>Use a utility such as "ip" to identify the Ethernet Medium Access Control (MAC) address of each interface. |
| 3. | Configure the physical interfaces:<br>Create a file, /etc/sysconfig/network-scripts/ifcfg-eth0 for the PSN interface:<br>Configure the IP address to be a static IP address on the PSN so that there is a known IP address for the PE to use as a connection point.<br>Configure the MAC address to ensure that the network system uses the correct interface.<br>Create a file, /etc/sysconfig/network-scripts/ifcfg-eth1 for the XC interface:<br>Configure the MAC address to ensure that the network system uses the correct interface.<br>Do not configure any IP addressing, as this interface will be used for layer-2 bridging and not layer-3 IP. |
| 4. | Install the kernel module for tunnelling:<br>Use a utility such as "insmod" to install the "tun" kernel module. |
| 5. | Create the user-space tap device to permit tunnelling by a user-space program as follows:<br>Use a utility such as "mknod" to create a tap1 pseudo-interface. |
| 6. | Create a kernel layer-2 bridge group that includes the eth1 (XC) and tap1 interfaces as follows:<br>Use the "brctl" utility to create a bridge-group br1.<br>Use the "brctl" utility to add the eth1 and tap1 interfaces to bridge-group br1. |
| 7. | Configure the interfaces in bridge-group br1 to be operational as follows:<br>Use a utility such as "ip" to configure the br1, eth1 and tap1 interfaces to have an IP address of 0.0.0.0, to be promiscuous and to have a runstate of "up". |
| 8. | Decide on the utility software to use to create the PSN-TUNNEL over the PSN between the tap1 device on the PE and the peer tap-device on the PC. The most commonly used candidate systems are; Secure-Shell (ssh), Vtun, OpenVPN and Tinc. |
| 9. | Enable the server software for the chosen PSN-TUNNEL software. Ssh basic example is:<br>Use a utility such as "ntsysv" to enable the "ssh" service. |
| 10. | Configure the software that will terminate the PSN-TUNNEL over the PSN to receive incoming connections from the remote PE. Ssh basic example is:<br>Add the "PermitTunnel yes" configuration to the /etc/ssh/sshd_config file.<br>Configure ssh to accept generic connections from the PE using any of the ssh user authorisation methods. |
| 11. | Create the PSN-TUNNEL over the PSN between the tap1 device on the PE and the peer tap-device on the PC. Ssh basic example is:<br>No action required for ssh if actions in 9 and 10 have been chosen and completed.<br>Configurations are different for the other utilities but are fully documented in publicly available documentation. |
| 12. | Once operational, steps 3 through 11 can be automated in scripts per the build-engineer's preferred arrangement such as Upstart or via /etc/rc.d/rc.local. Ssh basic example is:<br>| No action required for ssh if actions in 10 & 11 have been chosen and completed. |

It should also be understood that all of the various and sundry components of this invention may be or are well known and conventional per se, and some thereof may have been patented in their own right at some time in the past. Therefore, it is their interconnection and interactions that effect the new combinations of elements constituting this invention and cause the stated unique unexpected results and features to be achieved thereby.

Additional advantages and modification will readily occur to those skilled in the art. The invention in its broader aspects is therefore not limited to the specific details, representative system, and the illustrative examples shown and described herein. Accordingly, the departures may be made from the details without departing from the spirit or scope of the disclosed general inventive concept.

What is claimed is:

1. A system for rapid-deployment and delivery of a layer-2 connection, comprising:

a first provider-edge appliance connectable to a first unknown network, the first provider-edge appliance being operable to originate a first open system interconnection (OSI) layer-2 Ethernet pseudo-wire connection over a first packet switch network tunnel connection;

at least one provider-core comprising a cross-connect that waits for the first packet switch network tunnel connection, whereupon completing the first packet switch network tunnel connection, the first provider-edge appliance and the at least one provider-core connect to establish the first open system interconnection layer-2 Ethernet pseudo-wire connection through an access port on the first provider-edge appliance and at least one port on a cross-connect on the at least one provider-core; and a second provider-edge appliance connectable to a second unknown network, the second provider-edge appliance originating a second open system interconnection layer-2 Ethernet pseudo-wire connection over a second packet switch network tunnel connection to the at least one provider-core, whereupon completing the second packet switch connection, the first provider-edge appliance and the second provider-edge appliance connect to establish the open system interconnection layer-2 Ethernet pseudo-wire connection through the at least one port on the cross-connect on the at least one provider-core.

2. The system for the rapid-deployment and delivery of the layer-2 pseudo-wire as defined in claim 1, wherein an end-to-end pseudo wire connection is created between the first provider-edge appliance and the second provider-edge appliance.

3. The system of claim 1, wherein the first provider-edge appliance and the at least one provider-core auto connect to establish the first open system interconnection layer-2 Ethernet pseudo-wire connection between the port on the first provider-edge appliance and the at least another port on the cross-connect on the at least one provider-core.

4. A method for rapid-deployment and delivery of a layer-2 pseudo-wire connection comprising:

initiating a provider-core to provider-core open system interconnection layer-2 Ethernet cross-connect hub/service;

engaging two incoming open system interconnection layer-2 Ethernet legs with the layer-2 Ethernet cross-connect hub/service for cross connection of the two incoming open system interconnection layer-2 Ethernet legs, wherein each of the two incoming open system interconnection layer-2 Ethernet legs comprise a layer-2 Ethernet pseudo-wire connection; and providing an open system interconnection layer-2 Ethernet access-circuit to open system interconnection layer-2 Ethernet access-circuit end-to-end open system interconnection layer-2 Ethernet connection between two provider-edge appliances that cannot connect directly to each other because of a communications barrier comprising a member selected from the group consisting of firewalls, incompatible IP addresses, and combinations thereof, wherein each of the two provider edge appliances are operable for connection to an unknown network.

5. A system for rapid-deployment and delivery of a layer-2 connection comprising:

a first provider-edge appliance, at a first site, comprising a plurality of ports;

a second provider-edge appliance, at a second site, comprising another plurality of ports;

a first provider-core appliance and a second provider-core-appliance, each comprising a plurality of ports, including one or more cross-connect ports;

the first provider-edge appliance at the first site is connected to a first unknown network and is configured to use a first packet switch network connection to a first trunk network and establish a first packet switch network-tunnel connection to the first provider-core appliance at the first site, the first provider-core appliance being pre-configured to accept an incoming connection request from the first provider-edge appliance such that when the first packet switch network-tunnel connection is established a first Ethernet connection exists between the first provider-edge appliance and a first of the one or more cross-connect ports on the first provider-core appliance;

the second provider-edge appliance at the second site is connected to a second unknown network and is configured to use a second packet switch network connection to a second trunk network and establish a second packet switch network-tunnel connection to the second provider-core appliance at the second site, and the second provider-core appliance being pre-configured to accept another incoming connection request from the second provider-edge appliance such that when the second packet switch network-tunnel connection is established a second Ethernet connection exists between the second provider-edge appliance and a second of the one or more cross-connect ports on the second provider-core appliance, wherein when the first and the second of the one or more cross-connect ports are in communication, then an end-to-end Ethernet connection is established between the first provider-edge appliance and the second provider-edge appliance.

6. The system for the rapid-deployment and delivery of the layer-2 connection as defined in claim 5, wherein the first provider-edge appliance comprises at least one Ethernet port.

7. The system for the rapid-deployment and delivery of the layer-2 connection as defined in claim 6, wherein the Ethernet port comprises at least one port selected from the group consisting of an access-circuit service port, a trunk packet-switched-network (PSN) port, and combinations thereof.

8. The system for the rapid-deployment and delivery of the layer-2 connection as defined in claim 5, wherein the second provider-core appliance comprises at least one Ethernet port.

9. The system for the rapid-deployment and delivery of the layer-2 connection as defined in claim 8, wherein the Ethernet port comprises at least one port selected from the group consisting of a trunk packet-switched-network (PSN) port, a cross-connect port, and combinations thereof.

10. The system for the rapid-deployment and delivery of the layer-2 connection as defined in claim 5, wherein an end-to-end pseudo wire connection is created between the first provider-edge appliance and the second provider-edge appliance.

11. The system of claim 5, wherein an identity of the first provider-edge appliance is defined by information comprising at least one member selected from the group consisting of an internet protocol address of the first provider-core appliance, a media access control address of the first provider-edge appliance, a unique character string assigned to the first provider-edge appliance, another unique identifier, and combinations thereof.

12. The system of claim 5, wherein an identity of the second provider-edge appliance is defined by information comprising at least one member selected from the group consisting of an internet protocol address of the first provider-core appliance, a media access control address of the second provider-edge appliance, a unique character string assigned to the second provider-edge appliance, another unique identifier, and combinations thereof.

13. A method for the rapid-deployment and delivery of a layer-2 connection comprising:
   providing a first provider-edge appliance, at a first site, having a plurality of ports;
   providing a second provider-edge appliance, at a second site, having another plurality of ports;
   providing a first provider-core appliance and a second provider-core-appliance, each having a plurality of ports, including one or more cross-connect ports;
   configuring the first provider-edge appliance, connected to a first unknown network, at the first site to use a first packet switch network to a first trunk network and establish a first packet switch network-tunnel connection to the first provider-core appliance at the first site,
   the first provider-core appliance pre-configured to accept an incoming connection request from the first provider-edge appliance such that when the first packet switch network-tunnel connection is established a first Ethernet connection exists between the first provider-edge appliance and a first of the one or more cross-connect ports on the first provider-core appliance;
   configuring the second provider-edge appliance, connected to a second unknown network, at the second site to use a second packet switch network connection to a second trunk network and establish a second packet switch network-tunnel connection to the second provider-core appliance at the second site,
   the second provider-core appliance pre-configured to accept another incoming connection request from the second provider-edge appliance such that when the second packet switch network-tunnel connection is established a second Ethernet connection exists between the second provider-edge appliance and a second of the one or more cross-connect ports on the second provider-core appliance; and
   engaging for communication the first and the second of the one or more cross-connect ports, such that an end-to-end Ethernet connection is established between the first provider-edge appliance and the second provider-edge appliance.

14. The method for the rapid-deployment and delivery of the layer-2 connection as defined in claim 13, wherein the step of providing the first provider-edge appliance further comprises providing at least one Ethernet port.

15. The method for the rapid-deployment and delivery of the layer-2 connection as defined in claim 14, wherein the step of providing at least one Ethernet port further comprises providing at least one of an access-circuit service port, a trunk packet-switched-network (PSN) port or combinations thereof.

16. The method for the rapid-deployment and delivery of the layer-2 connection as defined in claim 13, wherein the step of providing at least one provider-core further comprises at least one Ethernet port.

17. The method for the rapid-deployment and delivery of the layer-2 connection as defined in claim 16, wherein the step of providing the Ethernet port further comprises at least one port selected from the group consisting of a trunk packet-switched-network (PSN) port, a cross-connect port, and combinations thereof.

18. A system for rapid-deployment and delivery of a layer-2 connection comprising:
   first and second provider-edge appliances that originates first and second open system interconnection layer-2 Ethernet pseudo-wire connections over first and second packet switch network-tunnels over first and second open system interconnection layer-3 packet switch networks, the first and second provider edge appliances each being connectable to unknown networks; and
   a provider-core that waits for the first and second packet switch network-tunnel connections via the first and second open system interconnection layer-3 packet switch networks and which connect together and establish an open system interconnection layer-2 Ethernet pseudo-wire between first and second access circuit Ethernet ports on the first and second provider-edge appliances and Ethernet cross-connect ports on the provider-core.

19. A system for rapid-deployment and delivery of a layer-2 connection comprising:
   a provider-core to provider-core open system interconnection layer-2 Ethernet cross-connect hub/service that permits two incoming open system interconnection layer-2 Ethernet pseudo-wire legs to be connected together at the Ethernet cross-connect hub/service to provide an open system interconnection Layer-2 Ethernet access circuit to open system interconnection layer-2 Ethernet access circuit end-to-end open system interconnection layer-2 Ethernet data service between two provider-edge appliances that cannot connect directly to each other because of firewalls and incompatible IP addresses, wherein the two provider edge appliances are each operable for connection to an unknown network.

* * * * *